US007646759B2

(12) United States Patent
Hegde et al.

(10) Patent No.: US 7,646,759 B2
(45) Date of Patent: Jan. 12, 2010

(54) APPARATUS AND METHOD FOR CONFIGURING DATA PLANE BEHAVIOR ON NETWORK FORWARDING ELEMENTS

(75) Inventors: Shriharsha S. Hegde, Beaverton, OR (US); Russell J. Fenger, Beaverton, OR (US); Amol Kulkarni, Beaverton, OR (US); Hsin-Yuo Liu, Beaverton, OR (US); Hormuzd M. Khosravi, Hillsboro, OR (US); Manasi Deval, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1046 days.

(21) Appl. No.: 10/338,291

(22) Filed: Jan. 7, 2003

(65) Prior Publication Data

US 2004/0131079 A1    Jul. 8, 2004

(51) Int. Cl.
*H04L 12/28* (2006.01)
(52) U.S. Cl. .................................................... 370/351
(58) Field of Classification Search ................. 370/351, 370/389, 395.21, 400, 401, 419; 709/220–222, 709/227–229, 249, 250
See application file for complete search history.

(56) References Cited

U.S. PATENT DOCUMENTS

| 5,537,417 | A | * | 7/1996 | Sharma et al. | ............... | 709/228 |
| 5,699,350 | A | * | 12/1997 | Kraslavsky | .................. | 370/254 |
| 5,987,517 | A | * | 11/1999 | Firth et al. | .................. | 709/230 |
| 6,393,496 | B1 | * | 5/2002 | Schwaderer et al. | ......... | 719/328 |
| 6,532,241 | B1 | * | 3/2003 | Ferguson et al. | ............ | 370/469 |
| 6,654,750 | B1 | * | 11/2003 | Adams et al. | ................. | 707/10 |
| 6,681,262 | B1 | * | 1/2004 | Rimmer | ..................... | 709/250 |
| 7,203,740 | B1 | | 4/2007 | Putzolu et al. | | |

FOREIGN PATENT DOCUMENTS

EP    0767564 A2    4/1997

OTHER PUBLICATIONS

Decasper, Router Plugins: a software architecture for next-generation routers, IEEE/ACM transactions on networking, vol. 8, No. 1, Feb. 2000. (a better quality copy in comparisson with the IDS copy).*
Decasper, Dan et al., "Router Plugins: A Software Architecture for Next-Generation Routers", IEEE, vol. 8, No. 1, Feb. 2000, pp. 2-15, XP-000924285.

(Continued)

*Primary Examiner*—Dmitry Levitan
(74) *Attorney, Agent, or Firm*—Blakely, Sokoloff, Taylor & Zafman LLP

(57) ABSTRACT

A method and apparatus for configuring data plane behavior on network forwarding elements are described. In one embodiment, the method includes receiving, within a network element control plane, protocol configuration information extracted from a protocol application utilizing a network protocol application programming interface (API). Once the protocol configuration information is received, the protocol configuration information is processed using a control interface corresponding to the network protocol implemented by the protocol application. Once the protocol configuration information is processed, the control interface programs one or more data plane forwarding elements of the network element according to protocol configuration information. Accordingly, by providing similar control interfaces for multiple, network protocols, inter-operability between components from multiple vendors is enabled.

34 Claims, 12 Drawing Sheets

OTHER PUBLICATIONS

Rosen, Eric C., et al. "Multiprotocol Label Switching Architecture", Aug. 1999, pp. 1-62, XP-002195041.

Blake, S., et al. "An Architecture for Differentiated Services", Dec. 1998, pp. 1-22, XP-002139608.

Quality of Service Using the Resource ReSerVation Protocol (RSVP) on Internet Protocol (IP) v4 and IPv6 Platforms, URL:http://web.archive.org/web/2000119081808/ http://www.engnus.edu.sg/EResnews/9908 pp. 1-4 XP-002288885.

Int'l Search Report mailed Aug. 10, 2004 in co-pending PCT Application No. PCT/US2004/000094.

* cited by examiner

CONVENTIONAL NETWORK 300

US 7,646,759 B2

APPARATUS AND METHOD FOR CONFIGURING DATA PLANE BEHAVIOR ON NETWORK FORWARDING ELEMENTS

FIELD OF THE INVENTION

One or more embodiments of the invention relate generally to the field of network communications and protocols. More particularly, one or more of the embodiments of the invention relate to a method and apparatus for configuring data plane behavior on network forwarding elements.

BACKGROUND OF THE INVENTION

Today, numerous independent hardware vendors (IHV) produce networking Applications Specific Integrated Circuits (ASIC) to perform a myriad of packet processing tasks. Unfortunately, the current interface to such ASICs are generally memory mapped registers that have corresponding bit level behavior and documentation. However, not all IHVs limit their products to register level descriptions, some offer C-level or other software interfaces to the hardware. However, these interfaces are merely a convenient reflection of the underlying registers and, therefore, differ from one IHV to another.

Furthermore, the register level descriptions or their software interfaces to the hardware ASICs make these various products very difficult to use. In fact, these register level models represent a steep learning curve and tight coupling from an original equipment manufacturer (OEM) or an independent software vendor (ISV) that desires to use the ASIC or networking silicon in a product. At such a micro-level description (i.e., the register bits), it is difficult to write code that is reusable across these various ASICs. In addition, it is also difficult to decipher the micro-level functionality of the ASIC's networking silicon.

A recent trend in the networking industry is the replacement of ASIC, which are relatively inflexible, with more programmable but still performance oriented network devices such as network processors. Unfortunately, network processors are generally in their infancy stages and do not have an abstract programming model or do not have one expressive and flexible enough to grow with advances in the processor itself. Generally, network elements such as switches and routers can be classified into three logical operation components: the control plane, the forwarding plane and the management plane.

In general, the control plane executes different signaling and/or routing protocols and provides all the routing information to the forwarding plane. The forwarding plane makes decisions based on this information and performs operations on packets such as forwarding classification, filtering and so on. An orthogonal management plane manages the control and forwarding planes. However, the introduction of standardized application programming interfaces (API) within the above-mentioned planes can help system vendors OEMs and end users of these network elements to mix and match components available from different vendors to achieve a device of their choice.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for configuring data plane behavior on network forwarding elements are described. In one embodiment, the method includes receiving, within a network element control plane, protocol configuration information extracted from a network protocol stack (protocol application) utilizing a network protocol application programming interface (API). Once the protocol configuration information is received, the protocol configuration information is processed using a corresponding control interface of the control plane.

Once the protocol configuration information is processed, the control interface programs one or more data plane forwarding elements of the network element according to the received protocol configuration information. Accordingly, by providing similar control interfaces for multiple network protocols, inter-operability between components from multiple vendors is enabled. As a result, vendor independence is achieved which results in a quicker time to market, improved efficiency, lower costs and greater innovation for future network elements.

In the following description, for the purposes of explanation, numerous specific details are set forth in order to provide a thorough understanding of the embodiments of the present invention. It will be apparent, however, to one skilled in the art that the various embodiments of the present invention may be practiced without some of these specific details. In addition, the following description provides a subset of possible embodiments, and the accompanying drawings thereof, rather than to provide an exhaustive list of all possible implementations of the embodiments of the present invention. In other instances, well-known structures and devices are shown in block diagram form in order to avoid obscuring the details of the various embodiments of the present invention.

System Architecture

Figure 1:
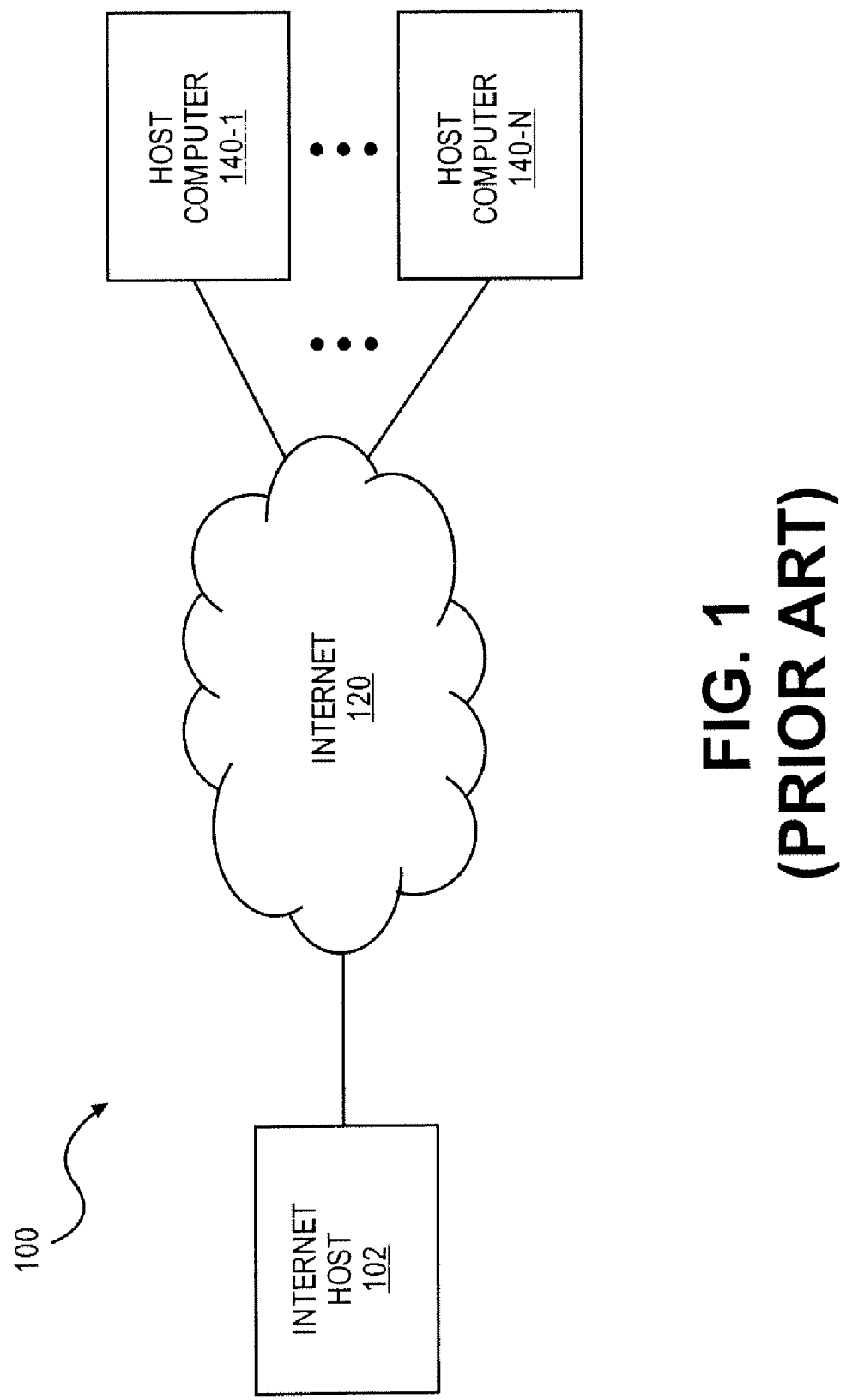
FIG. 1 is a block diagram illustrating a conventional computer network as known in the art.

FIG. 1 is a block diagram illustrating a conventional network 100, including an Internet host 102, coupled to host computers 140 (140-1, . . . , 140-N) via the Internet. Generally, the routing of information between Internet host 102 and host computers 140 is performed according to conventional means for transmitting data packets. The various packets are routed within the Internet from Internet host 102 to the various host computers 140. While this model is successful when transmitting conventional packetized information, a variety of applications, including teleconferencing, as well as multimedia applications have emerged, which are sensitive to delays incurred within conventional networks.

As a result, the emergence of such multimedia and real-time applications, which utilize networks such, as depicted in FIG. 1, have driven the demand for improving, as well as varying quality of service (QoS), switching, routing and the like from available networks. Likewise, various information (packets), which may be routed through network 100, may require various specialized, protocol activity. Unfortunately, networks, as depicted in FIG. 1, utilize a traditional best effort service model which does not pre-allocate bandwidth for handling network traffic, but simply routes packets utilizing current available bandwidth on a best effort basis. As a result, varying queuing delays and congestion across the Internet are quite common.

The best effort service model implemented by network 100 is based on the transmission control protocol (TCP) Internet protocol (IP) (TCP/IP). Specifically, the protocol implementation refers to Internet protocol version 4 (IPv4). In general, IPv4 is the most widely installed level of Internet protocol in use today. As known to those skilled in the art, an IP address is a 32-bit number that identifies each sender or receiver of information that is sent in packets across the Internet. An IP address generally has two parts: an identifier of a particular network on the Internet; and an identifier of the particular device within the network.

As such, the Internet is an interconnection of many individual networks, and IPv4 is a set of rules for one network communicating with another, provided that the network knows its own Internet address and that of any other networks with which it communicates. Unfortunately, the 32-bit IP address specified by IPv4 is very close to being exceeded. In other words, the Internet's growth makes it likely that without some new architecture, the number of possible network addresses using the addressing scheme provided by IPv4 may soon be exceeded. Likewise, the best effort service model provided by current TCP/IP is insufficient for various current, as well as future networking applications.

Accordingly, a next generation version of the Internet protocol has been implemented. As known to those skilled in the art, this next generation Internet protocol is referred to as "Internet protocol version 6" (IPv6). The most obvious improvement in IPv6 over IPv4 is that the IP addresses are lengthened from 32-bits to 128-bits. As a result, this extension anticipates considerable future growth of the Internet and provides relief for what was perceived as an impending shortage of network addresses. Furthermore, IPv6 describes rules for three types of addressing: uni-cast (one host to another host); any cast (one host to the nearest of multiple hosts); and multicast (one host to multiple hosts).

In addition, IPv6 provides various enhancements. For example, IPv6 enables an identification mechanism for packets deemed to require a higher QoS relative to other network traffic packets. In other words, packets belonging to an end-to-end path (or "flow") can be identified as a part of, for example, a multimedia presentation that requires real-time arrival. As a result, by providing this identification, packets requiring real-time delivery or which are sensitive to delay may be given a higher QoS relative to standard network traffic.

Figure 2:
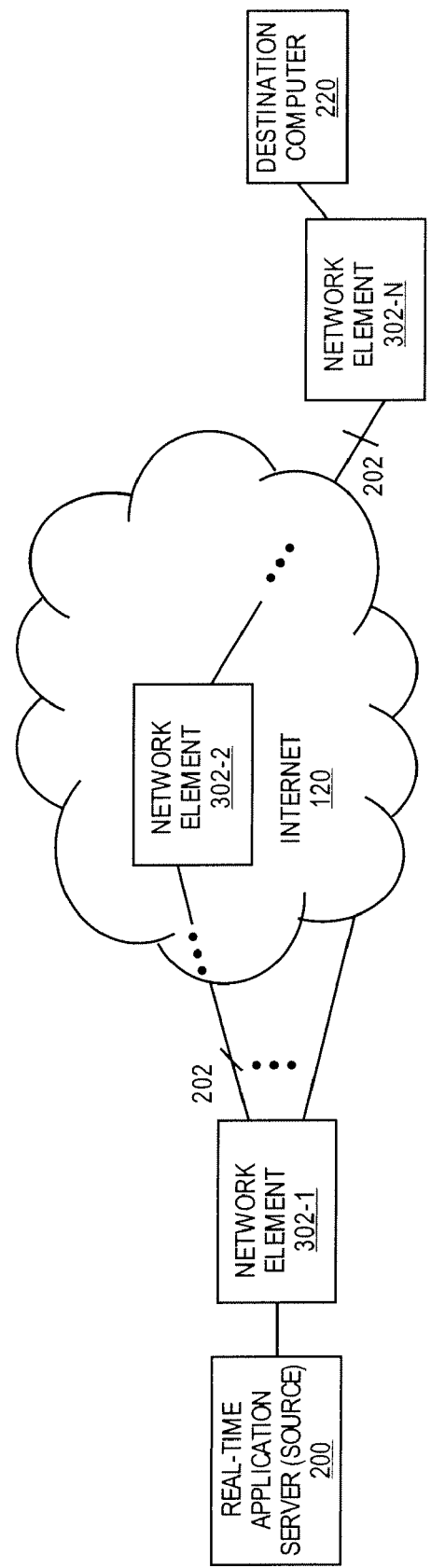
FIG. 2 is a block diagram illustrating the conventional computer network as depicted in FIG. 1, further illustrating various network elements utilized to route packets within the network as known in the art.

For example, FIG. 2 is a block diagram further illustrating the network of FIG. 1 depicted to illustrate the various network elements between, for example, a real-time application server (source computer) 200, and a destination computer 220. Due to the fact that the network is configured according to, for example, the IPv4 routing protocol, received network traffic is forwarded based on the best effort service model. As a result, transmission of packetized data 202 between the real-time application server 200 and a destination computer 220 incurs various routing delays due to the fact that congestion across the Internet is quite common as a result of the increasing widespread use of the Internet. For example, during peak hours, transmission of real-time packetized data would incur such substantial delays as to render the application unusable at the destination source computer.

A current network protocol (model) for providing service differentiation (varying QoS) for traffic flows is the differentiated services (DiffServ) model. The DiffServ model provides qualitative differentiation to flow aggregates unlike the hard guarantees such as delay bounds and assured bandwidth provided by the integrated service (IntServ) model. For example, the qualitative differentiation provided by the DiffServ model may be configured to provide Class A higher priority than Class B. Furthermore, the DiffServ model provides data path elements (DPE) including, but not limited to, classifiers, meters, droppers, queues and schedulers.

A further network protocol which may be utilized to, for example, speed up network traffic in order to implement applications which are very sensitive to queuing delays and congestion within the network such as, for example, audio and voice applications, is the multi-protocol label switching protocol (MPLS). The MPLS protocol is a standard approved technology for speeding network traffic flow, as well as simplified management thereof. MPLS involves setting up a specific path for a given sequence of packets identified by a label put into each packet. As a result, time is saved which is generally required for a router to look up the address to the next node to forward the packet.

In addition, MPLS is referred to as a multi-protocol because it works with the Internet protocol, asynchronous transfer mode (ATM) protocol and the frame relay network protocol, as known in the art. Furthermore, MPLS allows most packets to be forwarded at the layer-2 (switching) level, rather than the layer-3 (routing) level. Moreover, in addition to moving traffic faster, MPLS provides simplified management of a network for quality of service (QoS) and Traffic Engineering. Accordingly, networks implementing the MPLS protocol are able to adequately provide sufficient quality of service to different mixtures of network traffic. As described herein, the various routing, switching and QoS protocols described above are collectively referred to as "network protocols."

Figure 3:
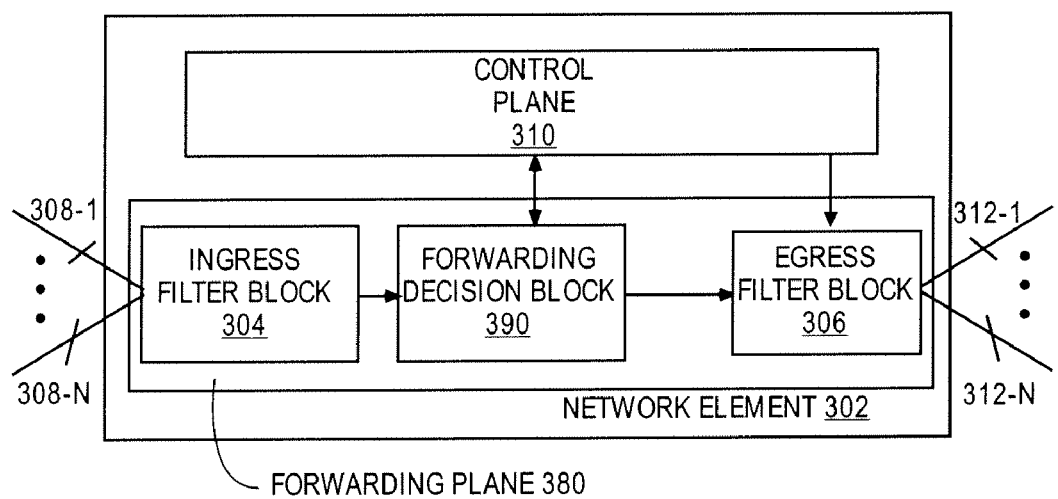
FIG. 3 is a block diagram illustrating a conventional network element utilized within the conventional network depicted in FIG. 2.

Referring now to FIG. 3, FIG. 3 is a conventional network element 302 as utilized within network 300, as shown in FIG. 2. As illustrated, the network element includes a forwarding plane 380 which uses an ingress filter block 304, a forwarding decision block 390 and an egress filter block 306 to route incoming packets 308 (308-1, . . . , 308-N) to a destination as output packets 312 (312-1, . . . , 312-N), as dictated by the control plane 310. Unfortunately, network element 302 provides tightly coupled forwarding and control planes within a single device. As a result, implementing varying QoS, as required by delay sensitive applications, within network element 302 generally requires intimate knowledge of a proprietary interface used within the device.

However, a recent trend in the networking industry is the replacement of conventional network elements, which are relatively inflexible, with more programmable, but still performance oriented, network devices such as network processors. Unfortunately, network processors are generally in their infancy stages and do not have an abstract programming model or do not have one expressive and flexible enough to grow with advances in the processor itself.

Generally, network elements such as switches and routers can be classified into three logical operation components: the control plane, the forwarding plane and the management plane. For example, the control plane executes different signaling or routing protocols and provides all routing information to the forwarding plane. The forwarding plane makes decisions based on this information and performs operations on packets such as forwarding, classification, filtering and so on. An orthogonal management plane manages the control and forwarding planes.

Figure 4:
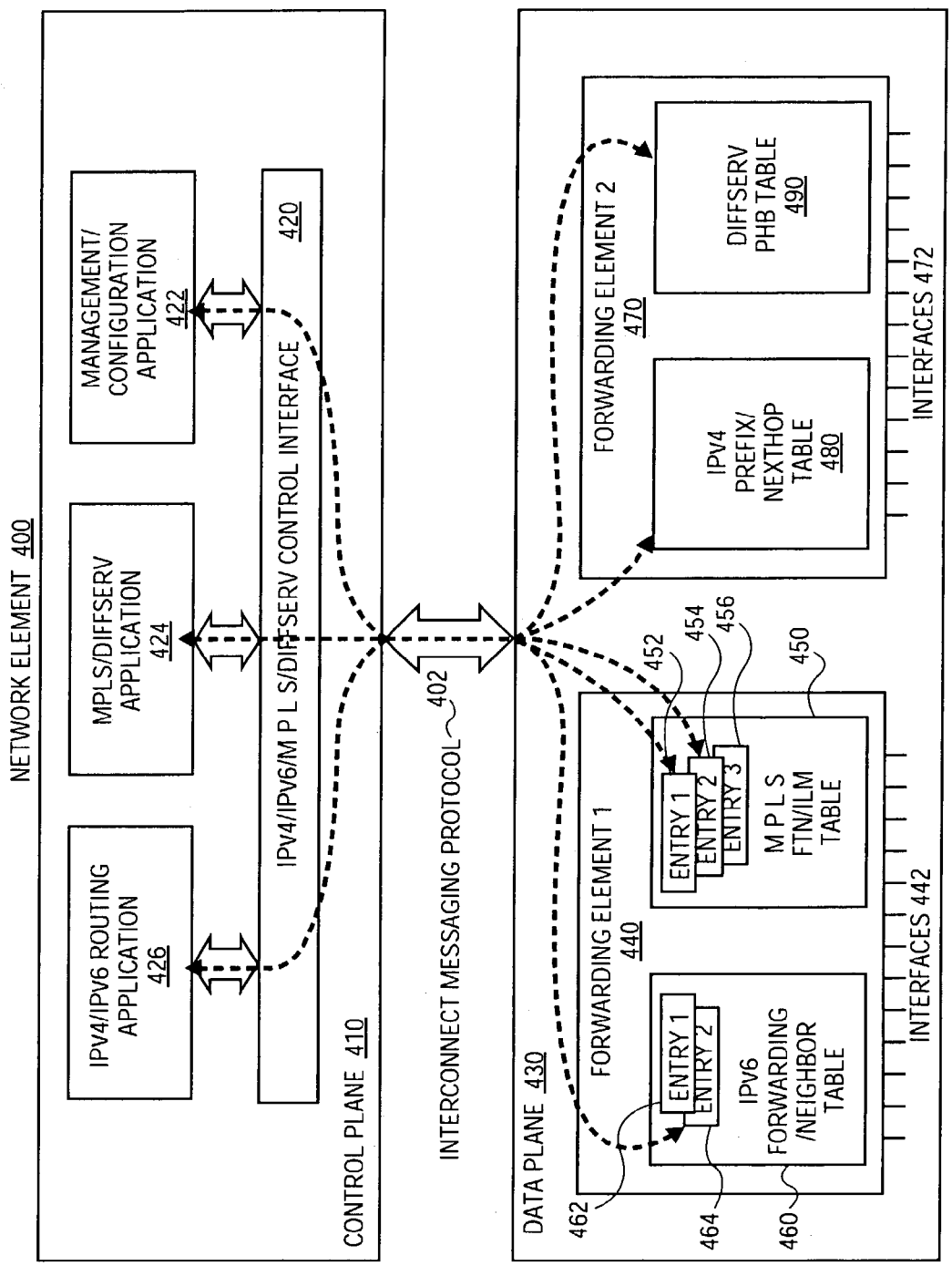
FIG. 4 is a block diagram illustrating a network element in accordance with one embodiment of the present invention.

However, the introduction of standardized application programming interfaces (API) within the above-mentioned planes can help system vendors, OEMs and end users of these network elements to mix and match components available from different vendors to achieve a device of their choice. Accordingly, FIG. 4 is a block diagram illustrating a network element 400 comprised of a separate control plane 410 and data plane 430 coupled together via interconnect 402, in accordance with one embodiment of the present invention.

In one embodiment, the control interface 420 enables queries of the data plane for determining information required to program the forwarding element of the data plane 430. This allows for a larger degree of generality in controlling the specific behavior in network forwarding elements. As described herein, the various parameters and information for generating a tables and populating their entries for implementing the respective protocol, is collectively referred to herein as "protocol configuration information."

Accordingly, control interface 420 is able to program a selected data plane forwarding element (e.g. forwarding elements 1 440/470) to implement third party network protocol stacks (protocol applications 450, 460, 480 and 490) within data plane 430, regardless of the vendor source of the data plane. In one embodiment, the control interface 420 programs the data plane 430 according to protocol configuration information extracted from the protocol application by an API corresponding with the protocol. For example, network element 400 is illustrated as implementing the IPv4, IPv6 routing protocols, as well as the MPLS and DiffServ network protocols ("network protocols"), via applications 424 and 426. Likewise, management/configuration application 422 is also provided.

In order to enable the various protocol applications from different third party developers, one embodiment of the present invention provides APIs for, for example, the IPv4 routing protocol, IPv6 routing protocol, MPLS network protocol and DiffServ network protocol. However, various APIs for additional protocols desired may be implemented in accordance with embodiments of the present invention. Accordingly, by utilizing an API in accordance with embodiments of the present invention, a third party protocol applications may be loaded with a vendor A control plane to implement a specific protocol as desired by the third party software developer within a vendor B data plane.

In one embodiment, communication interfacing, as well as implementation of the protocol within the data plane 430, is handled by the respective protocol API. In other words, control interface 420 exposes APIs for the protocols described above. As a result, incorporating a corresponding API into a conventional protocol application provides platform independent protocol applications. As such, in one embodiment, the corresponding API provides protocol configuration information extracted from the protocol application to control plane 420.

In one embodiment, the control plane 420 uses this protocol configuration information to program the data plane 430 forwarding elements to implement the protocol. In addition, communication between the control interface 420 and the data plane 430 is achieved using, for example, an interconnect message protocol, or the like. For example, the IPv6 routing protocol may be implemented within forwarding element 440. As illustrated, IPv6 forwarding tables, as well neighbor table 460 is formed within forwarding element 440 during device boot-up. In addition, as dictated by the protocol configuration information, the interface-specific table entries (462 and 464) are generated and populated within the respective table (460) in order to dictate routing of received packets via interfaces 442.

Likewise, MPLS includes forward equivalence class (FEC) to next hop label-forwarding entry (NHLFE) tables, which are referred to herein as FEC to NHLFE (FTN) tables. MPLS also includes incoming label map (ILM) tables. In the embodiments described, FTN and ILM (FTN/ILM) tables may also be implemented within forwarding element 440 with specific entries (452, 450, 454 and 456). The specific entries are dictated by the corresponding Label Distribution Protocol (LDP) application in order to control behavior of forwarding elements when receiving corresponding packets via interfaces 442. Likewise, the IPv4 routing protocol using IPv4 prefix/nexthop table 480, as well as the DiffServ routing protocol using Diffserv PHB table 490, may be implemented within forwarding element 470.

This capability is provided due to the fact that in one embodiment, the control interface 420 provides the mechanism to target one of many specific elements within the data plane 430. That is, a single, specific table entry within the one or more tables within one of multiple forwarding elements may be addressed. Likewise, in one embodiment, the control interface provides a mechanism for control plane components (protocol applications) to query the forwarding elements to determine parameters and capabilities of the data plane.

Figure 5:
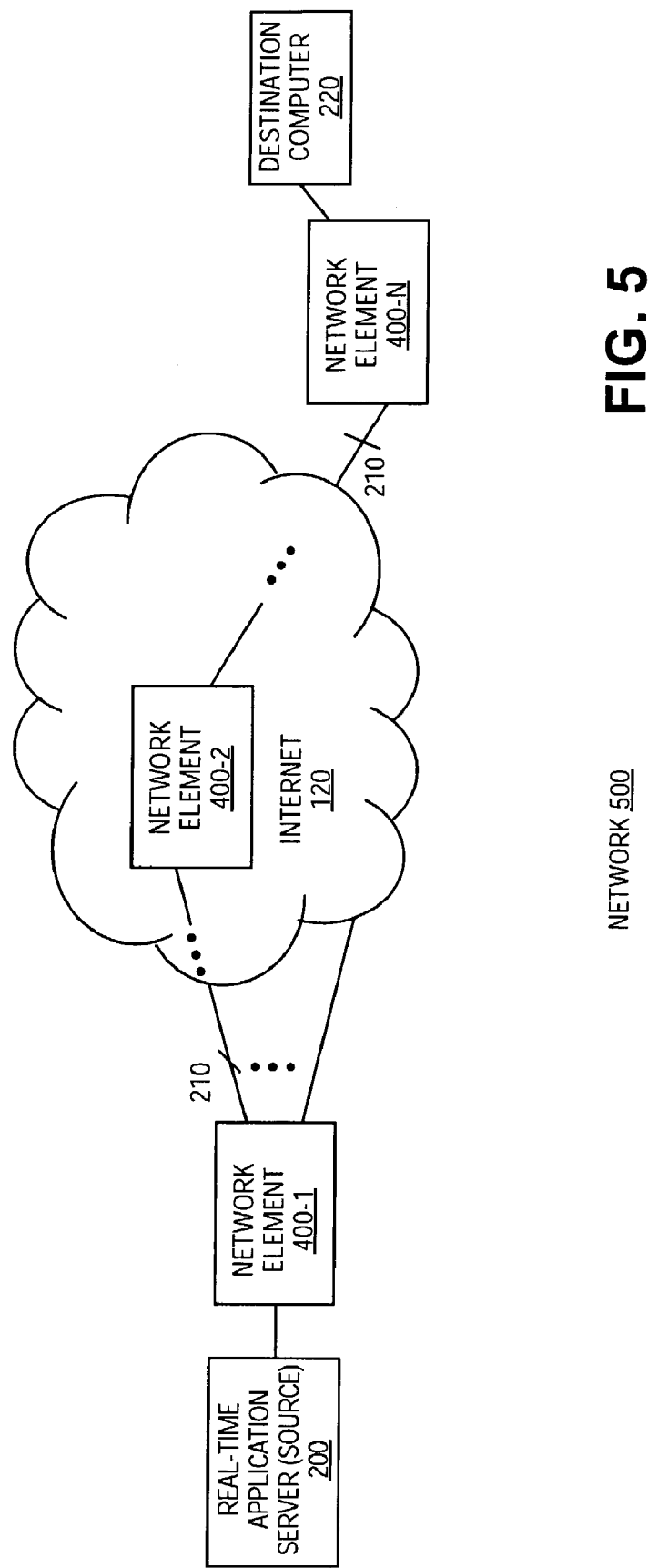
FIG. 5 is a computer network utilizing network elements as depicted in FIG. 4 in accordance with one embodiment of the present invention.

Accordingly, FIG. 5 is a block diagram illustrating a network 500 utilizing network elements 400, as depicted in FIG. 4, in accordance with one embodiment of the present invention. As illustrated, a real-time application server 200 is able to receive improved/varying QoS provided by, for example, the DiffServ network protocol within network element 400. Likewise, other various source computers may require a separate routing/network protocol such as, for example, IPv4 (for legacy applications) and IPv6 routing protocols, MPLS network, or the like. These protocols may be implemented within the network element using, for example, third party protocol applications including a corresponding protocol API according to an embodiment of the present invention.

Furthermore, the control interface 420 within network elements 400 is designed to be completely asynchronous in nature to support any kind of interconnect technology for interconnect 402 between the control and data planes. Control planes and data planes can be connected using network technologies such as Ethernet, cable line, a bus or optical fiber. Likewise, the connection between the control and data plane could be accomplished via bus technology such as compact PCI (peripheral component interconnect) or the control and data plane could be co-located and connected via interprocess communications. Procedural methods for implementing embodiments of the present invention are now described.

Operation

Figure 6:
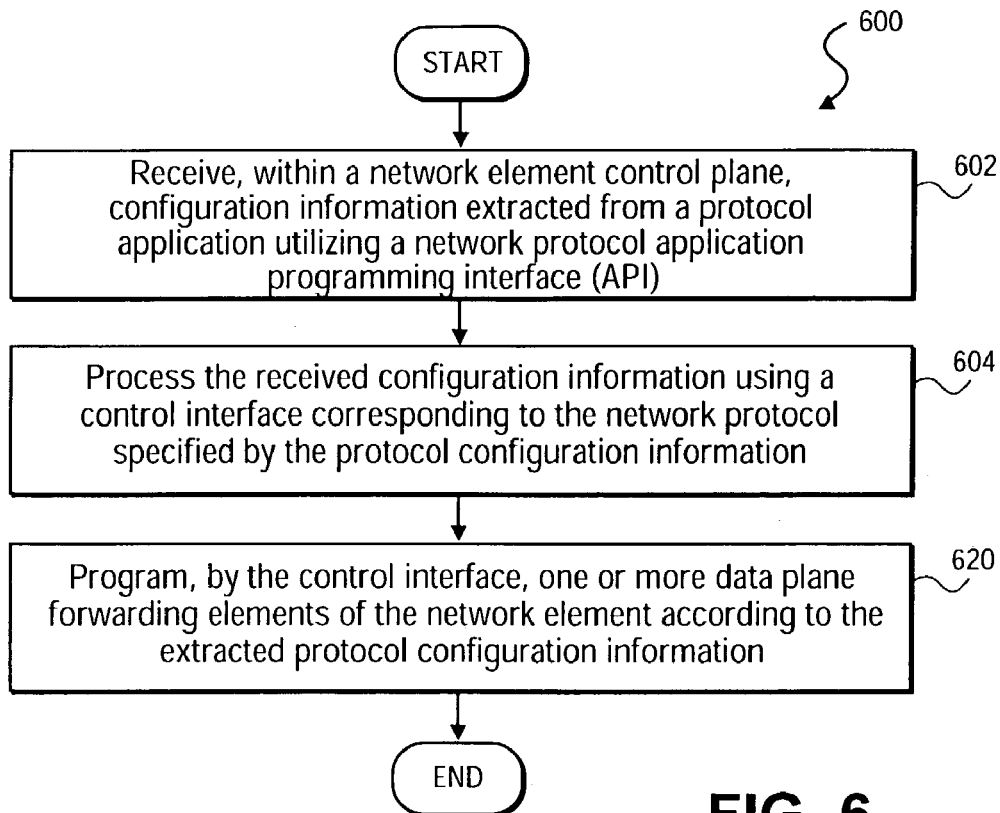
FIG. 6 is a flow chart illustrating a method for configuring data plane behavior on network forwarding elements in accordance with one embodiment of the present invention.

FIG. 6 is a flow chart illustrating a method 600 for configuring data plane behavior with the network forwarding elements of, for example, network element 400, as depicted in FIG. 4 in accordance with one embodiment of the present invention. At process block 602 protocol configuration information, extracted from a protocol application, is received within a network element control plane. In one embodiment, the protocol application implements a network/routing protocol utilizing a protocol application programming interface (API) which is responsible for extracting the protocol configuration information.

In one embodiment, the protocol API supports network protocols such as, for example, the DiffServ network protocol, MPLS network protocol, as well as IPv4 and IPv6 routing protocols. Accordingly, implementation of the respective protocol specified by the received protocol configuration information is hidden from the application programmer. Once the protocol configuration information application is received, at process block 604 the received protocol configuration information is processed using a control interface corresponding to the protocol implemented by the received protocol application.

For example, as depicted with reference to FIG. 4, control interface 420 is comprised of control interfaces IPv4, IPv6, MPLS and DiffServ control interfaces. As a result, control interface 420 determines a corresponding protocol interface for processing the application received from, for example, a third party developer. As such, once selected, at process block 620, one or more data plane forwarding elements of the network element are programmed according to the protocol configuration information extracted from the protocol application, for example, as illustrated in FIG. 4.

Figure 7:
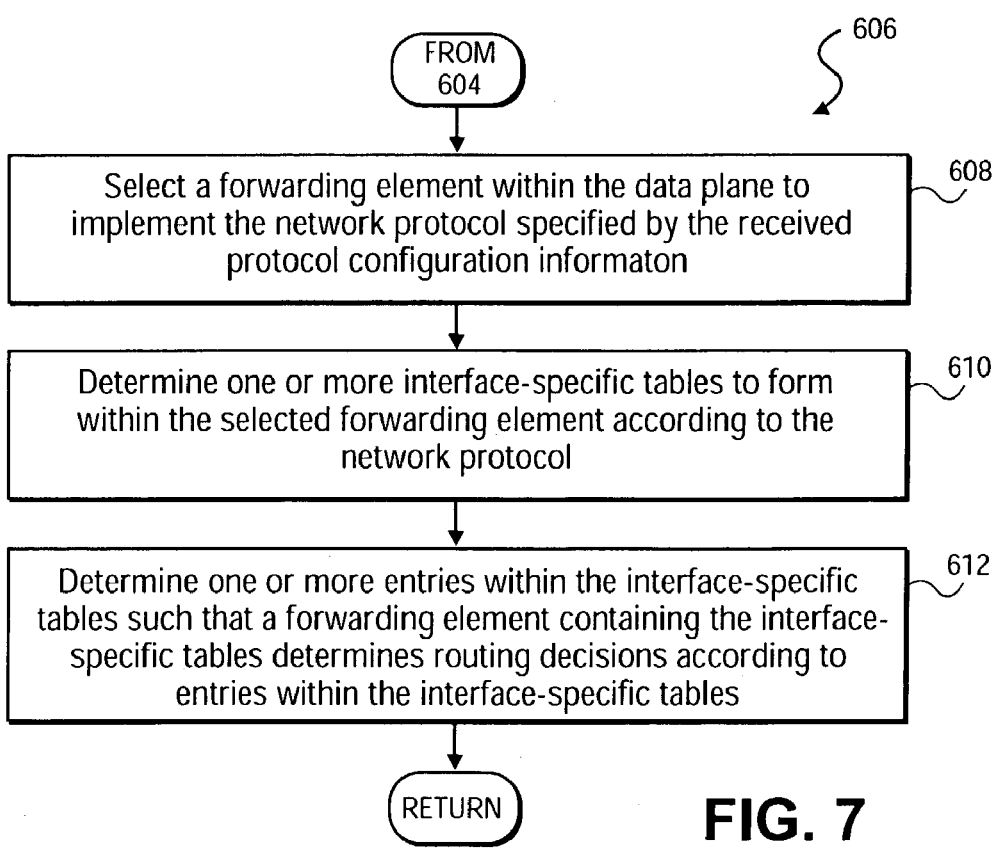
FIG. 7 is a flow chart illustrating a method for processing received configuration information using a control interface corresponding to a network protocol implemented by the received configuration information in accordance with one embodiment of the present invention.

FIG. 7 is a flow chart illustrating a method 606 for processing of received protocol configuration information at process block 604, as depicted in FIG. 6, in accordance with one embodiment of the present invention. At process block 608, the control interface selects a forwarding element within the data plane to implement the network routing or non-routing protocol associated with the received protocol configuration information. For example, control interface 420 could select forwarding element 440 to implement the IPv6 routing protocol.

Next, at process block 610, one or more interface-specific tables are determined that require formation within the selected forwarding element. Once determined at process block 612, one or more entries within the interface-specific (or protocol-specific) tables are determined by the control interface, according to the protocol configuration information. As a result, a forwarding element containing the interface-specific tables determines routing decisions according to entries within the interface-specific tables. For example, entries 1-3 of MPLS table 450 in addition to entries 1 and 2 of IPv6 table 460 are determined.

Figure 8:
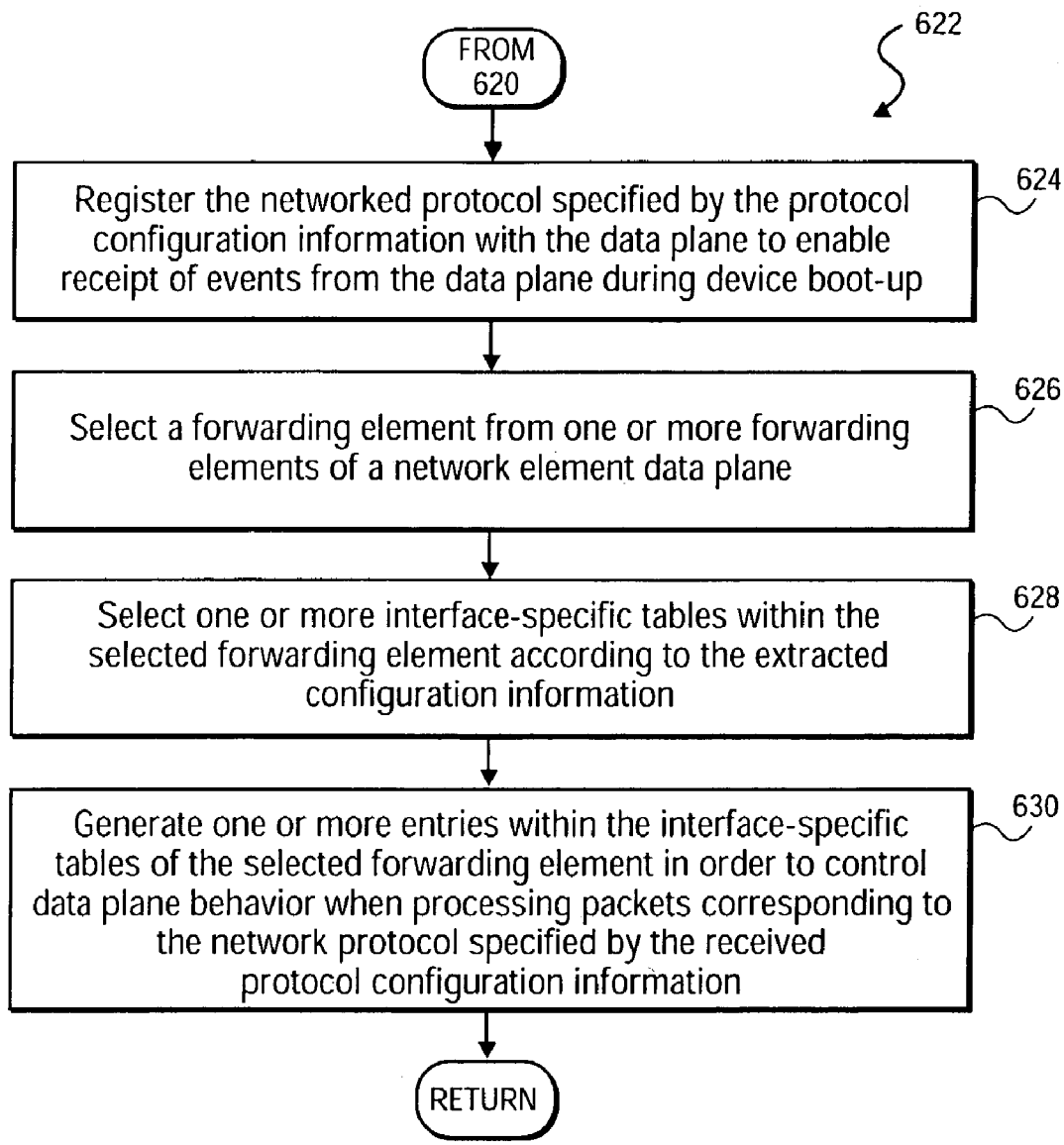
FIG. 8 is a flow chart illustrating a method for programming one or more data plane forwarding elements according to a network protocol in accordance with one embodiment of the present invention.

FIG. 8 is a flow chart illustrating a method 622 for programming the data plane forwarding elements of process block 620 as depicted in FIG. 6, in accordance with one embodiment of the present invention. At process block 624, after querying the protocol capability provided by the data plane, the network protocol specified by the protocol configuration information is registered with the data plane during device boot-up to enable receipt of events from the data plane. In other words, during various processing within the forwarding element, the implemented protocol may trigger an event that requires communication to the control plane in order to determine subsequent processing behavior within the data plane.

At process block 626 the control interface selects the forwarding element from one or more forwarding elements of the network data plane such as, for example, forwarding element 440 (FIG. 4). Next, at process block 628 one or more interface-specific tables, generated within the selected forwarding element at device boot-up, are selected. Once selected at process block 630, the control interface generates one or more entries within the interface-specific tables of the selected forwarding element, as dictated by the protocol configuration information extracted from a received protocol application by a corresponding protocol API.

Figure 9:
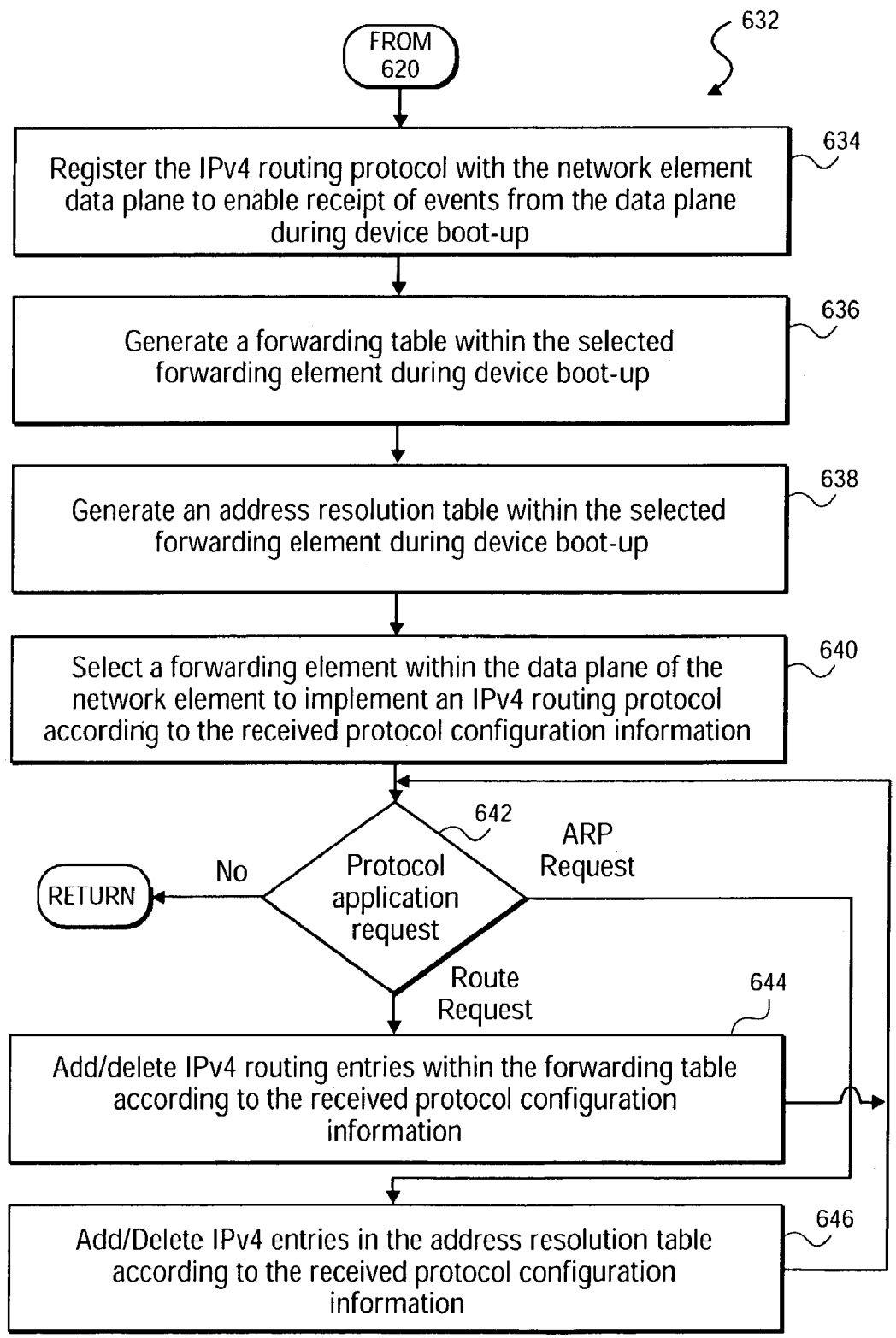
FIG. 9 is a flow chart illustrating a method for programming one or more data plane forwarding elements according to an IPv4 (Internet protocol version 4) routing protocol in accordance with one embodiment of the present invention.

FIG. 9 is a flow chart for a method 632 of programming data plane behavior of process block 620, as depicted in FIG. 6, in order to implement an IPv4 routing protocol in accordance with one embodiment of the present invention. At process block 634 the IPv4 routing protocol is registered with the network element data plane, during device boot-up, to enable receipt of events from the data plane. At process block 636, an IPv4 forwarding table is generated within the selected forwarding element within the selected forwarding element during device boot-up. At process block 638 an address resolution (ARP) table is generated within the selected forwarding element during device boot-up.

Next, at process block 640, a forwarding element within the data plane is selected to implement an IPv4 routing protocol. At process block 642 it is determined whether a request is received from the protocol application, which may include route update requests and ARP update request. When a route request is received, at process block 644, IPv4 routing entries are either added or deleted within the forwarding table according to the received update request. When an ARP request is received, at process block 646, IPv4 entries are either added or deleted within the address resolution table according to the received request. Accordingly, process blocks 642-646 are repeated until programming of the forwarding elements is complete.

Figure 10:
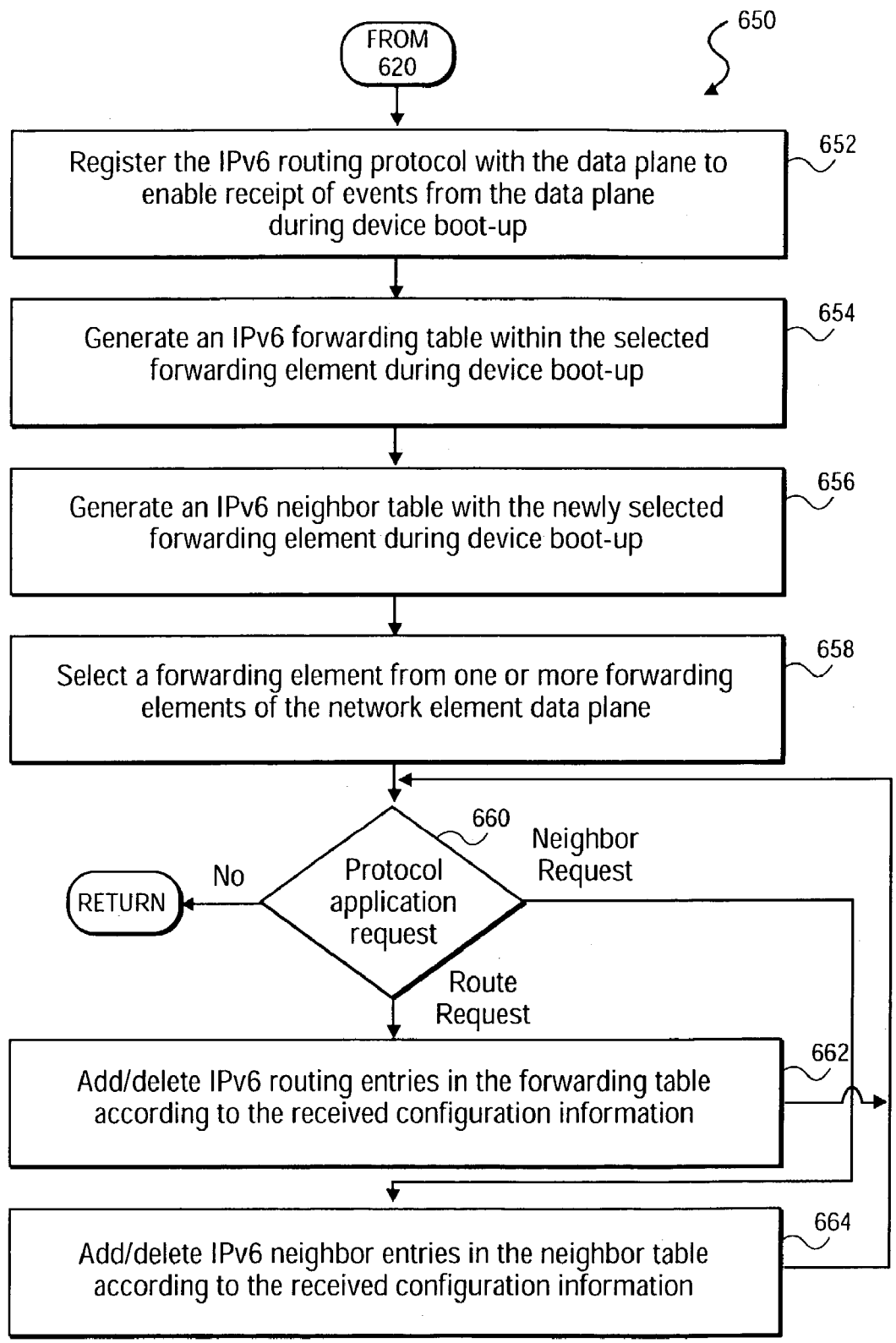
FIG. 10 is a flow chart illustrating a method for programming one or more data plane forwarding elements according to an IPv6 (Internet protocol version 6) routing protocol in accordance with one embodiment of the present invention.

FIG. 10 depicts a flow chart illustrating a method 650 for programming the data plane of process block 620, as depicted in FIG. 6, in order to implement an IPv6 routing protocol in accordance with one embodiment of the present invention. At process block 652, the IPv6 routing protocol is registered within the data plane, during device boot-up, to enable receipt of events from the data plane, as indicated above. At process block 654 an IPv6 forwarding table generated within the selected forwarding element during device boot-up. Once selected at process block 656, an IPv6 neighbor table is generated within the selected forwarding element during device boot-up.

Next, at process block 658, a forwarding element is selected from the network element data plane. At process block 660 it is determined whether a request is received from the protocol application, which may include route update requests and neighbor table update requests. When a route request is received, at process block 662 IPv6 routing entries are either added or deleted within the forwarding table according to the received request. When a neighbor table update request is received, at process block 664 IPv6 neighbor entries are either added or deleted in the neighbor table according to the received request. Accordingly, process blocks 660-664 are repeated until programming of the forwarding elements is complete.

Figure 11:
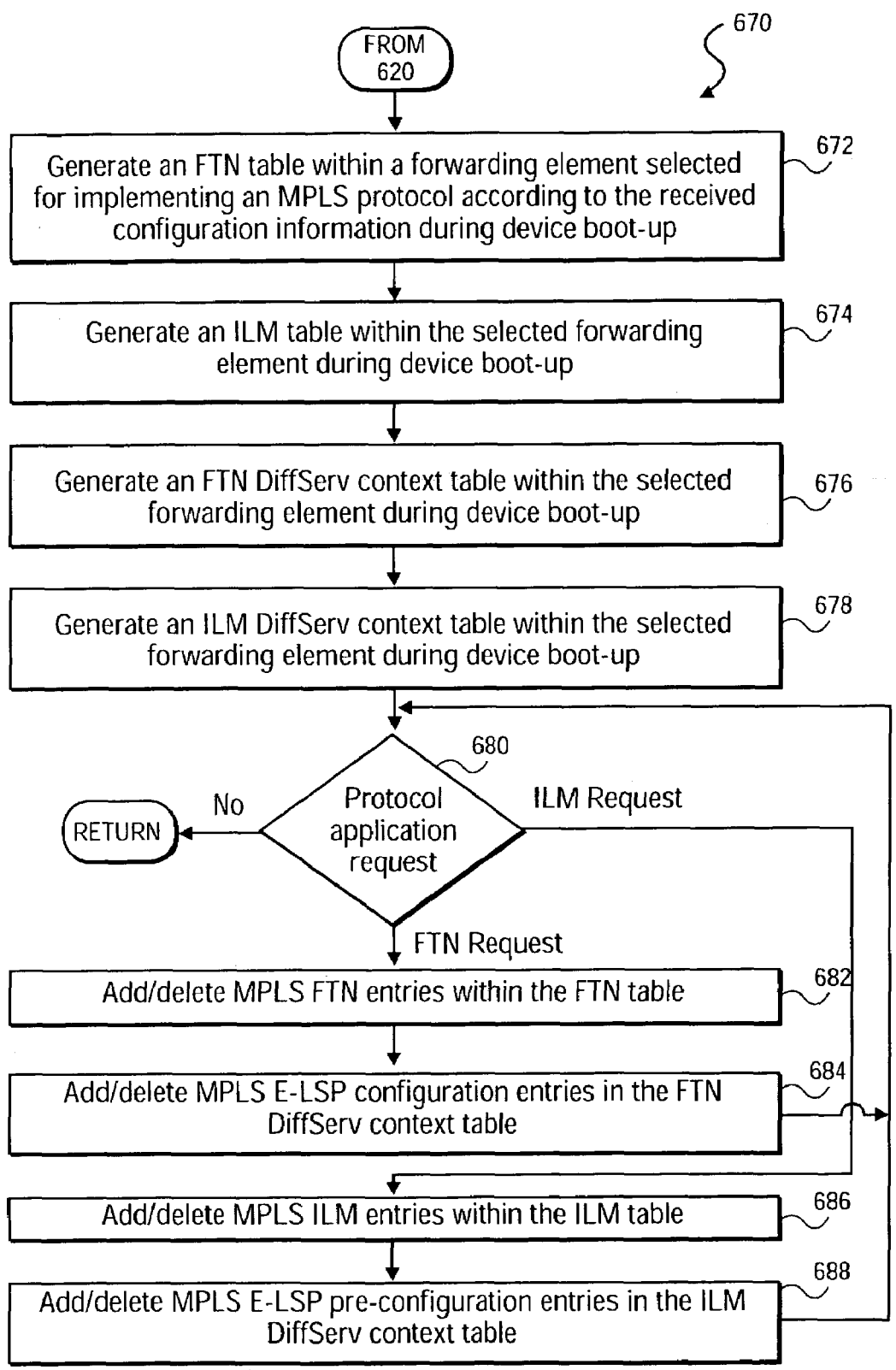
FIG. 11 is a flow chart illustrating a method for programming one or more data plane forwarding elements according to an MPLS (Multi-protocol label switching) protocol in accordance with one embodiment of the present invention.

FIG. 11 is a flow chart illustrating a method 670 for programming forwarding elements of the data plane at process block 620, as depicted in FIG. 6, to implement an MPLS network protocol in accordance with one embodiment of the present invention. At process block 672, an FTN table is generated within a forwarding element selected, during device boot-up, for implementing the MPLS switching protocol. At process block 674, an ILM table is generated within the selected forwarding element during device boot-up. Next, at process block 676, an FTN DiffServ context table is generated within the selected forwarding element during device boot-up.

Once generated, at process block 678, an ILM DiffServ context table is generated within the selected forwarding element during device boot-up. Once generated, at process block 680, it is determined whether a protocol application request is received. When an FTN request is received, process blocks 682 and 684 are performed. However, when an ILM request is received, process blocks 686 and 688 are formed. Otherwise, control flow returns to process block 620 (FIG. 6), which generally occurs once programming of the data plane forwarding elements is complete by repeating of process blocks 680-688 for each protocol application request.

Accordingly, at process block 682 MPLS FTN entries are either added or deleted within the FTN table when an MPLS FTN entry request is received. Likewise, at process block 684, MPLS E-LSP (explicit route label switch path) configuration entries are added or deleted in the FTN DiffServ context tables when an MPLS E-LSP configuration entry request is received. Otherwise, at process block 686 MPLS ILM entries are either added or deleted within the ILM table when an MPLS ILM entry request is received. Likewise, at process block 686, MPLS E-LSP pre-configuration entries are added or deleted within the ILM DiffServ context table when an MPLS E-LSP pre-configuration entry request is received.

Figure 12:
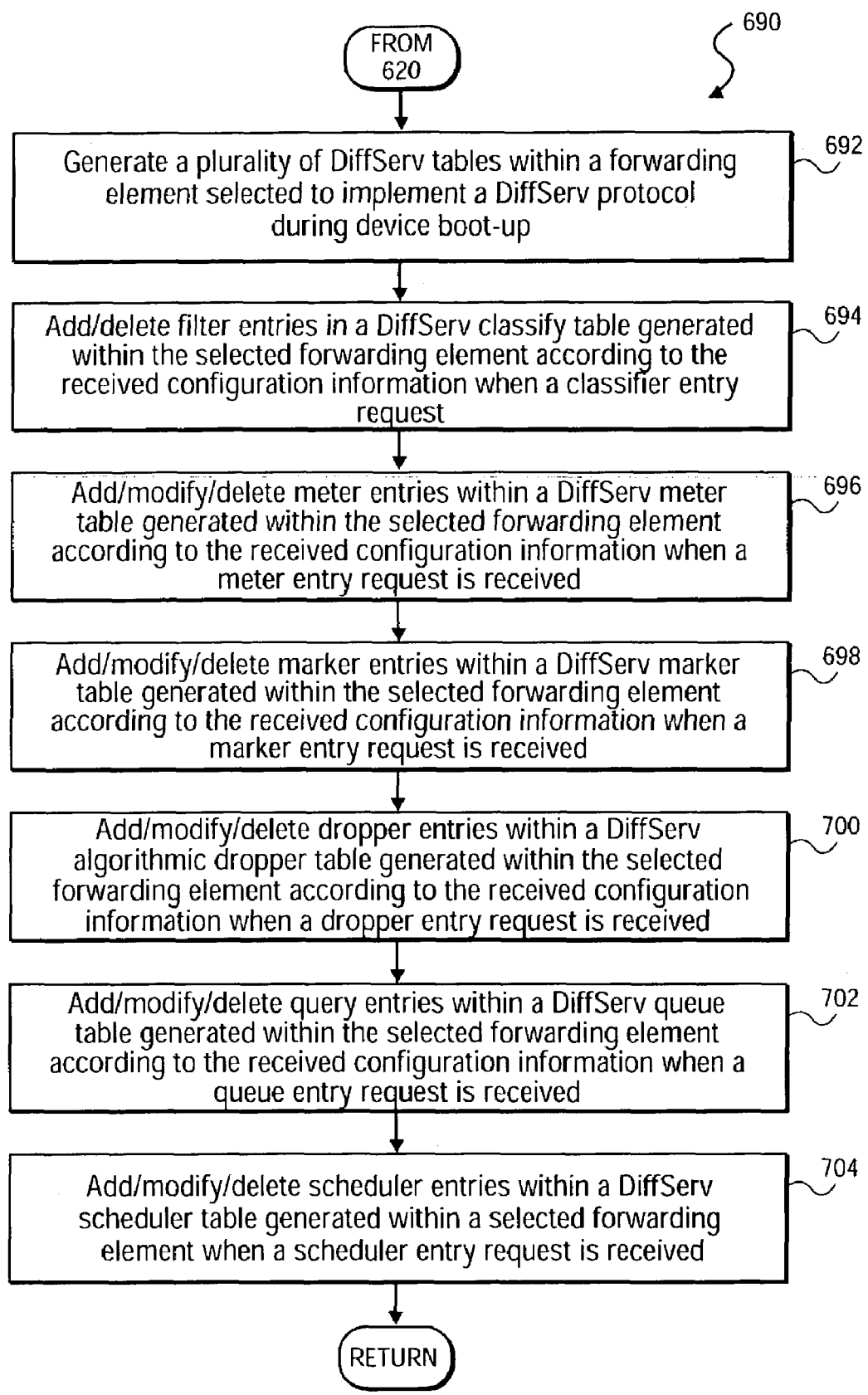
FIG. 12 is a flow chart illustrating a method for programming one or more data plane forwarding elements according a DiffServ (differentiated services) protocol in accordance with one embodiment of the present invention.

FIG. 12 is a flow chart illustrating a method 690 for programming data plane forwarding elements of process block 620, as depicted in FIG. 6, to implement a DiffServ network protocol in accordance with one embodiment of the present invention. At process block 692, a plurality of DiffServ tables are generated within the forwarding element selected to implement the DiffServ routing protocol, for example, DiffServ DPE, during device boot-up. In one embodiment, each call (protocol application request) my include entries of one of the following types: filter, meter, marker, queue or scheduler. At process block 694, filter entries are either added or deleted in a DiffServ classifier table when a classifier table entry request is received. At process block 696, meter entries within a DiffServ meter table are either added, modified or deleted when a meter entry request is received.

Furthermore, at process block 698, marker entries within a DiffServ marker table are added, modified or deleted when a marker table entry request is received. At process block 700, dropper entries are added, modified or deleted within a DiffServ algorythmic dropper table generated within the selected forwarding element when a dropper entry request is received. At process block 702 query entries within a DiffServ queue are added, modified or deleted when a queue entry request is received. Finally, at process block 704, scheduler entries within a DiffServ scheduler table are either added, modified or deleted when a scheduler table entry request is received.

Figure 13:
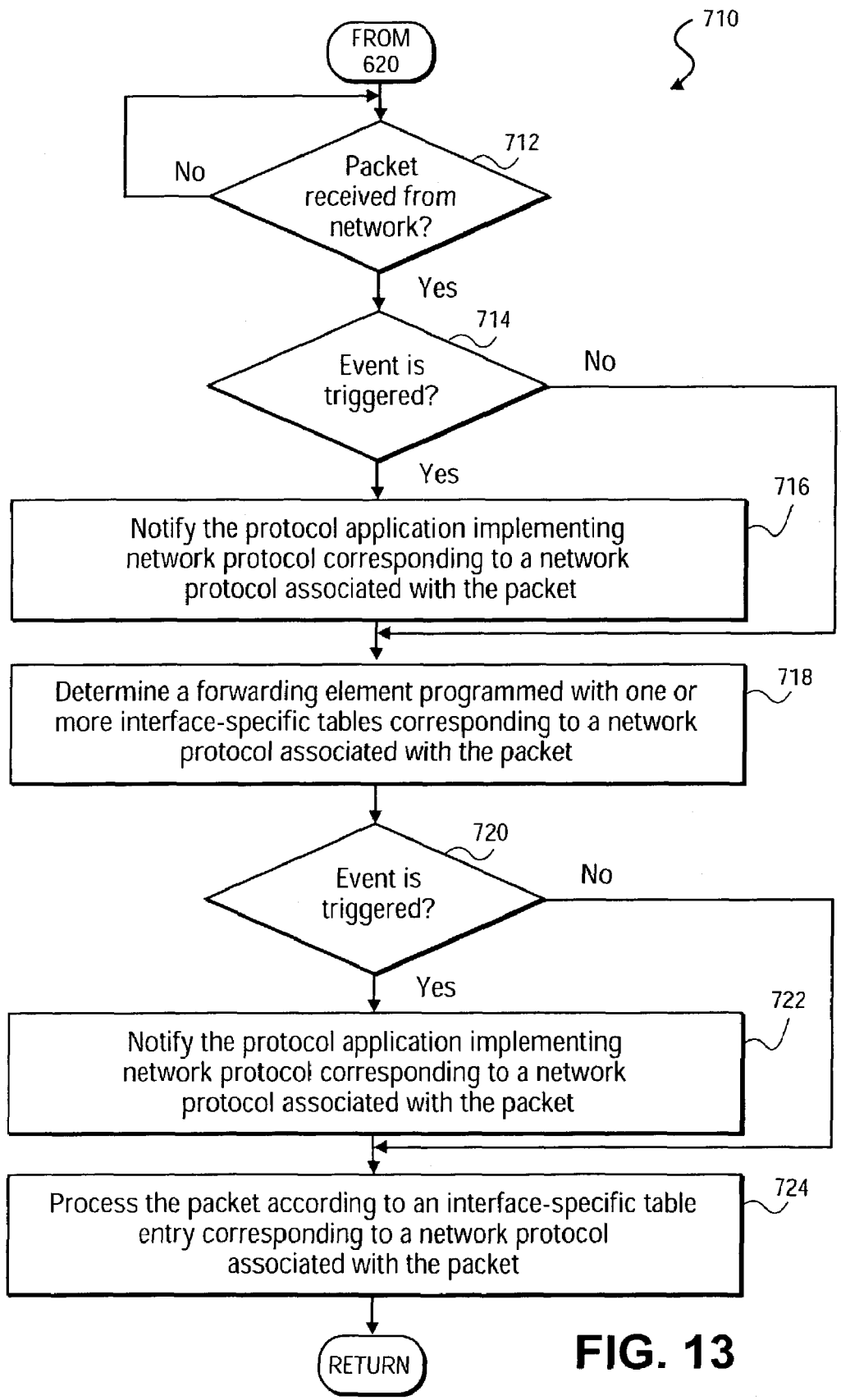
FIG. 13 is a flow chart illustrating a method for processing a received packet within a forwarding element programmed according to a control plane control interface for implementing a routing protocol in accordance with one embodiment of the present invention.

Finally, FIG. 13 is a flow chart illustrating a method 710 for behavior of, for example, a network element implementing a control interface in accordance with one embodiment of the present invention. At process block 712 it is determined whether a packet is received. Once received at process block 714, it is determined whether an event is triggered by the received packet, such as a "protocol unsupported" event. When an event is triggered process block 716 is performed. At process block 716 a forward element application, implementing the network protocol corresponding to the received packet, is notified of the event. In one embodiment, notification may include forwarding of the received packet to a responsible forwarding element.

Otherwise at process block 718, a forwarding element, programmed with one or more interface-specific tables corresponding to the network protocol associated with the packet, is determined. Once determined, at process block 720, at it is determined whether an event is triggered by table look-up, such as a "missing entry/no entry found" event. When an event is triggered process block 722 is performed. At process block 722 a forward element application, implementing the network protocol corresponding to the received packet, is notified of the event. In one embodiment a "no entry found" event could cause a DROP action of the received packet by the forwarding element.

Otherwise, at process block 724 the forwarding element processes the packet according to an interface-specific table entry corresponding to the network protocol associated with the packet and populated according to corresponding protocol configuration information. In one embodiment, communication between the control plane and the data plane is provided via, for example, an interconnect messaging protocol as known in the art. In alternative embodiments, additional messaging or commmunciation protocols between the control plane and data plane may be utilized.

Accordingly, utilizing embodiments of the present invention third party protocol application development for, for example, network processors may be implemented regardless of the vendor source of either the control plane or data plane elements of the forwarding elements such as a network processor. In other words, use of control interfaces and corresponding APIs, in accordance with embodiments of the present invention, allow interoperability between components of multiple vendors for implementing network elements to provide improved, as well as varying quality of service to a plurality of varying network traffic.

Accordingly, by isolating network/routing protocol implementations within data planes from third party protocol application developers, platform independence is achieved which results in quicker time to market of products, improved efficiency and lower costs and greater innovation. Furthermore, the control interface provided is designed to be completely asynchronous in nature to support any kind of internet interconnect technology between the control and data plane. As a result, control and data planes can be connected using network technologies such as, for example, Ethernet fiber.

Likewise, the connection (interconnect link) between the control and data planes can be made via bus technology such as compact PCI or the control and data plane can be co-located and connected via interprocess communication. Furthermore, the control interfaces provide an easy to use, scaleable and robust interface to configure IPv4/IPv6/MPLS/DiffServ behavior in a network processor data plane. In one embodiment a network processor, for example, as manufactured by the Intel Corporation of Santa Clara, Calif., is used for the management, applications and routing/MPLS/QoS applications running in the control plane. Furthermore, integration of third party routing stacks and management applications are also easily implemented utilizing a control interface in accordance with embodiments of the present invention.

Alternate Embodiments

Several aspects of one implementation of the control interface and API for configuring multiple data plane behavior have been described. However, various implementations of the control interface and API provide numerous features including, complementing, supplementing, and/or replacing the features described above. Features can be implemented as part of the control plane or as part of a network element in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a control interface and APIs for a network element, it will be appreciated by those skilled in the art that the embodiments of the present invention can be applied to other systems. In fact, systems for supporting multiple protocols with a network element fall within the embodiments of the present invention, as defined by the appended claims. The embodiments described above were chosen and described in order to best explain the principles of the embodiments of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
receiving, within a network element control plane, at least one protocol application request issued from a protocol application to an application programming interface (API) that is exposed by a control interface corresponding to a network protocol of the protocol application;
extracting protocol configuration information, according to the protocol application request issued to the exposed API, from the protocol application using the control interface corresponding to the network protocol to determine the protocol configuration information requested by the protocol application; and
programming, by the control interface, one or more forwarding elements of a network element data plane in response to the extracted protocol configuration information to implement the network protocol of the protocol application within the data plane using a processor, wherein a vendor of the control plane is different than a vendor of the data plane.

2. The method of claim 1, wherein extracting the received protocol configuration information further comprising:
selecting a forwarding element within the data plane to implement the network protocol specified by the protocol configuration information;
determining one or more interface-specific tables to form within the selected forwarding element according to the extracted protocol configuration information; and
determining one or more entries within the interface-specific tables such that a forwarding element containing the interface-specific tables determines decisions according to entries within the interface-specific tables.

3. The method of claim 1, wherein programming the one or more data plane forwarding elements further comprises:
registering the network protocol specified by the extracted protocol configuration information with the data plane to enable receipt of events from the data plane;
selecting a forwarding element from one or more forwarding elements of a network element data plane;
querying the selected forwarding element for one or more interface-specific tables within the selected forwarding element according to the extracted protocol configuration information; and
generating and populating one or more entries within the interface-specific tables of the selected forwarding element in order to control data plane behavior when processing packets corresponding to the network protocol implemented by the protocol application.

4. The method of claim 3, wherein generating further comprises:
querying the selected forwarding element to determine the generated interface-specific tables; and
populating the generated interface-specific tables according to the received protocol configuration information.

5. The method of claim 1, wherein programming the data plane elements further comprises:
registering the network protocol with the network element data plane to enable receipt of events from the data plane during boot-up;
selecting a forwarding element within the data plane of the network element to implement an IPv4 routing protocol according to the received protocol configuration information;
querying the selected forwarding element for a forwarding table generated within the selected forwarding element during boot-up;
querying the selected forwarding element for an address resolution table generated within the selected forwarding element during boot-up;
adding/deleting IPv4 routing entries within the forwarding table when a protocol application route update request is received; and adding/deleting IPv4 entries in the address resolution table when a protocol application address resolution table update request is received.

6. The method of claim 1, wherein programming the one or more data plane forwarding elements further comprises:
registering the network protocol with the data plane to enable receipt of events from the data plane during boot-up;
selecting a forwarding element of the network element data plane to implement an IPv6 routing protocol according to the received protocol configuration information;
querying the selected forwarding element for an IPv6 forwarding table generated within the selected forwarding element during boot-up;
querying the selected forwarding element for an IPv6 neighbor table generated within the selected forwarding element during boot-up;
adding/deleting IPv6 routing entries in the forwarding table when a protocol application route update request is received; and
adding/deleting IPv6 neighbor entries in the neighbor table when a protocol application neighbor table update request is received.

7. The method of claim 1, wherein programming the one or more forwarding elements of the data plane further comprises:
generating a plurality of DiffServ tables within a forwarding element selected to implement a DiffServ network protocol during boot-up;
adding/deleting filter entries in a DiffServ classifier table generated within the selected forwarding element when a protocol application classifier update request is received;
adding/modifying/deleting meter entries within a DiffServ meter table generated within the selected forwarding element when a protocol application meter update request is received;
adding/modifying/deleting marker entries within a DiffServ marker table generated within the selected forwarding element when a protocol application marker update request is received;
adding/modifying/deleting dropper entries within a DiffServ algorithmic dropper table generated within the selected forwarding element when a protocol application dropper update request is received;
adding/modifying/deleting query entries within a DiffServ queue table generated within the selected forwarding element when a protocol application queue update request is received; and
adding/modifying/deleting scheduler entries within a DiffServ scheduler table generated within a selected forwarding element when a protocol application scheduler update request is received.

8. The method of claim 1, further comprising:
receiving, within the data plane, a packet;
when a first event is triggered, notifying a protocol application implementing a network protocol corresponding to the received packet;
otherwise, determining a forwarding element programmed with one or more interface-specific tables corresponding to a network protocol associated wit the received packet;
when a second event is triggered, notifying a protocol application implementing a network protocol corresponding to the received packet; and
otherwise, processing the received packet according to an interface-specific table entry generated by the control interface according to the protocol configuration information and associated with the received packet.

9. The method of claim 1, wherein the network protocol API is one of a routing protocol API, a switching protocol API, and a quality-of-service (QoS) protocol API.

10. The method of claim 9, wherein the routing protocol API is one of an IPv4 protocol and an IPv6 protocol.

11. The method of claim 9, wherein the switching protocol API is an MPLS protocol API and the QoS protocol API is a DiffServ protocol API.

12. The method of claim 1, wherein the network protocol API comprises quality-of-service capabilities to enable associating packets of a particular traffic flow with a desired special handling.

13. The method of claim 12, wherein the desired special handling comprises at least one of real-time service or non-default quality-of-service.

14. The method of claim 1, wherein a vendor of the protocol application is different from the vendor of the control plane and the vendor of the data plane.

15. A computer readable storage medium including program instructions that direct a computer to perform a method when executed by a processor, the method comprising:
receiving, within a network element control plane, at least one protocol application request issued from a protocol application to an application programming interface (API) that is exposed by a control interface corresponding to a network protocol of the protocol application;
extracting protocol configuration information, according to the protocol application request issued to the exposed API, from the protocol application using the control interface corresponding to the network protocol to determine the protocol configuration information requested by the protocol application; and
configuring, by the control interface, one or more forwarding elements of a network element data plane in response to the extracted protocol configuration information to implement the network protocol of the protocol application within the data plane, where a vendor of the control plane is different than a vendor of the data plane.

16. The computer storage medium of claim 15, wherein extracting the received software further comprises:
selecting a forwarding element within the data plane to implement the network protocol specified by the extracted protocol configuration information;
determining one or more interface-specific tables to form within the selected forwarding element according to the extracted protocol configuration information; and
determining one or more entries within the interface-specific tables such that a forwarding element containing the interface-specific tables determines decisions according to entries within the interface-specific tables.

17. The computer readable storage medium of claim 15, wherein configuring the one or more data plane forwarding elements further comprises:
registering the network protocol specified by the extracted protocol configuration information with the data plane to enable receipt of events from the data plane during boot-up;
selecting a forwarding element from one or more forwarding elements of a network element data plane;
querying the selected forwarding element for one or more interface-specific tables within the selected forwarding element according to the extracted protocol configuration information; and
generating and populating one or more entries within the interface-specific tables of the selected forwarding element in order to control data plane behavior when processing packets corresponding to the network protocol implemented by the third party protocol application.

18. The computer readable storage medium of claim 15, wherein the method further comprises:
receiving, within the data plane, a packet;
when a first event is triggered, notifying a protocol application implementing a network protocol corresponding to the received packet;
otherwise, determining a forwarding element programmed with one or more interface-specific tables corresponding to a network protocol associated with the received packet;
when a second event is triggered, notifying a protocol application implementing a network protocol corresponding to the received packet; and
otherwise, processing the received packet according to an interface-specific table entry generated by the control interface according to the protocol configuration information and associated with the received packet.

19. The computer readable storage medium of claim 15, wherein the network protocol API is one of a routing protocol API, a switching protocol API, and a quality-of-service (QoS) protocol API.

20. The computer readable storage medium of claim 19, wherein the routing protocol API is one of an IPv4 protocol and an IPv6 protocol.

21. The computer readable storage medium of claim 19, wherein the switching protocol API is an MPLS protocol API.

22. The computer readable storage medium of claim 19, wherein the QoS protocol API a DiffServ protocol API.

23. The computer readable storage medium of claim 15, wherein the network protocol API comprises quality-of-service capabilities to enable associating packets of a particular traffic flow with a desired special handling.

24. The computer readable storage medium of claim 23, wherein the desired special handling comprises at least one of real-time service or non-default quality of service.

25. A network element, comprising:
a processor;
a data plane, coupled to the processor, including one or more forwarding elements to process received packets according to a corresponding interface-specific table contained within a respective forwarding element;
a control plane communicably coupled to the data plane, the control plane to include at least one protocol application implementing a network protocol using an application programming interface (API) that is exposed by a control interface corresponding to the network protocol of the protocol application; and
the control interface to generate and program the interface-specific tables contained within the data plane, according to at least one protocol application request issued to the exposed API from the protocol application, to extract protocol configuration information from the protocol application of the control plane using the exposed API corresponding to the network protocol of the protocol application and the processor to extract the protocol configuration information,
wherein a vendor of the control plane is different than a vendor of the data plane.

26. The network element of claim 25, wherein the control interface is further caused to select a forwarding element within the data plane to implement the network protocol specified by protocol configuration information; determine one or interface-specific tables to formed within the selected forwarding element according to extracted protocol configuration information; and determine according to protocol configuration information, one or more entries within the interface-specific tables such that a forwarding element containing the interface-specific tables determines protocol decisions according to entries within the interface-specific tables.

27. The network element of claim 25, wherein the control interface is further caused to register the network protocol specified by the protocol configuration information with the data plane to enable receipt of events from the data plane during boot-up; select a forwarding element from one or more forwarding elements of a network element data plane; query the selected forwarding element for one or more interface-specific tables generated within the selected forwarding element during boot-up; and generate and populate one or more entries within the interface-specific tables of the selected forwarding element according to extracted protocol configuration information.

28. The network element of claim 25, wherein the control interface is further caused to receive, within the data plane, a packet; determine a forwarding element programmed with one or more interface-specific tables corresponding to a network protocol associated with the packet; process the packet according to an interface-specific table entry generated by the control interface according to received protocol configuration information; and when an event is triggered, notify the protocol application implementing a network protocol associated with the packet.

29. The network element of claim 25, wherein an interconnect link between the control plane and the data plane is one of a cable, an optical fiber, and an Ethernet link.

30. A system comprising:
a network including a plurality of coupled network elements, comprising:
a data plane including one or more forwarding elements to process received packets according to a corresponding interface-specific table contained within a respective forwarding element;
a control plane communicably coupled to the data plane, the control plane including at least one protocol application implementing a network protocol using an application programming interface (API) that is exposed by a control interface corresponding to the network protocol of the protocol application; and
a control interface to generate and program the interface-specific tables contained within the data plane according to at least one protocol application request issued from the protocol application to the exposed API to extract protocol configuration information from the protocol application of the control plane using the API corresponding to the network protocol of the protocol application, where a vendor of the control plane is different than a vendor of the data plane.

31. The system of claim 30, wherein the control interface is further caused to select a forwarding element within the data plane to implement the network protocol specified by protocol configuration information; determine one or more interface-specific tables to formed within the selected forwarding element according to extracted protocol configuration information; and determine according to protocol configuration information, one or more entries within the interface-specific tables such that a forwarding element containing the interface-specific tables determines protocol decisions according to entries within the interface-specific tables.

32. The system of claim 30, wherein the control interface is further caused to register the network protocol specified by the protocol configuration information with the data plane to enable receipt of events from the data plane during boot-up; select a forwarding element from one or more forwarding elements of a network element data plane; query the selected forwarding element for one or more interface-specific tables generated within the selected forwarding element during boot-up; and generate and populate one or more entries within the interface-specific tables of the selected forwarding element according to extracted protocol configuration information.

33. The system of claim 30, wherein the control interface is further caused to receive, within the data plane, a packet; determine a forwarding element programmed with one or more interface-specific tables corresponding to a network protocol associated with the packet; process the packet according to an interface-specific table entry generated by the control interface according to received protocol configuration information; and when an event is triggered, notify the protocol application implementing a network protocol associated with the packet.

34. The system of claim 30, wherein an interconnect link between the control plane and the data plane is one of a cable, an optical fiber and an Ethernet link.

* * * * *

UNITED STATES PATENT AND TRADEMARK OFFICE
CERTIFICATE OF CORRECTION

PATENT NO. : 7,646,759 B2
APPLICATION NO. : 10/338291
DATED : January 12, 2010
INVENTOR(S) : Hegde et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1213 days.

Signed and Sealed this

Twenty-eighth Day of December, 2010

David J. Kappos
*Director of the United States Patent and Trademark Office*